(12) United States Patent
Weinrotter et al.

(10) Patent No.: US 8,919,313 B2
(45) Date of Patent: Dec. 30, 2014

(54) LASER IGNITION DEVICE

(75) Inventors: Martin Weinrotter, Stuttgart-Botnang (DE); Werner Herden, Gerlingen (DE); Pascal Woerner, Korntal-Münchingen (DE); Juergen Raimann, Weil der Stadt (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 13/322,875

(22) PCT Filed: May 26, 2010

(86) PCT No.: PCT/EP2010/057201
§ 371 (c)(1),
(2), (4) Date: Feb. 16, 2012

(87) PCT Pub. No.: WO2010/139577
PCT Pub. Date: Dec. 9, 2010

(65) Prior Publication Data
US 2012/0132167 A1    May 31, 2012

(30) Foreign Application Priority Data
Jun. 5, 2009    (DE) .......................... 10 2009 026 794

(51) Int. Cl.
*F02P 23/04*    (2006.01)
*H01S 3/042*    (2006.01)
*H01S 3/04*    (2006.01)

(52) U.S. Cl.
CPC ................. *F02P 23/04* (2013.01); *H01S 3/042* (2013.01); *H01S 3/0401* (2013.01)
USPC ....................................................... 123/143 B

(58) Field of Classification Search
CPC .................................. F02P 23/04; F02P 9/007
USPC ....................................................... 123/143 B
See application file for complete search history.

(56) References Cited

U.S. PATENT DOCUMENTS

| | | | |
|---|---|---|---|
| 4,523,552 A | 6/1985 | Mukainakano et al. | |
| 8,312,854 B2 * | 11/2012 | Weinrotter et al. | 123/143 B |
| 8,607,755 B2 * | 12/2013 | Weinrotter et al. | 123/143 B |
| 2009/0159032 A1 | 6/2009 | Gruber | |
| 2010/0275867 A1 * | 11/2010 | Weinrotter et al. | 123/143 B |
| 2010/0275868 A1 * | 11/2010 | Herden et al. | 123/143 B |
| 2011/0185996 A1 * | 8/2011 | Kraus et al. | 123/143 B |
| 2011/0259292 A1 * | 10/2011 | Woerner et al. | 123/143 B |

(Continued)

FOREIGN PATENT DOCUMENTS

| | | |
|---|---|---|
| AT | 505 766 | 4/2009 |
| DE | 198 10 750 | 4/1999 |

(Continued)

OTHER PUBLICATIONS

International Search Report of PCT/EP2010/057201, dated Oct. 7, 2010.

*Primary Examiner* — Hai Huynh
(74) *Attorney, Agent, or Firm* — Kenyon & Kenyon LLP

(57) ABSTRACT

An ignition laser includes a laser-active solid body, a housing, and a combustion chamber window. The heat value of the ignition laser is settable in accordance with the requirements of the internal combustion engine.

10 Claims, 5 Drawing Sheets

(56) References Cited

U.S. PATENT DOCUMENTS

| | | | | |
|---|---|---|---|---|
| 2011/0308489 | A1* | 12/2011 | Herden | 123/143 B |
| 2012/0024250 | A1* | 2/2012 | Weyl et al. | 123/143 B |
| 2012/0037108 | A1* | 2/2012 | Herden et al. | 123/143 B |
| 2012/0145107 | A1* | 6/2012 | Schwarz et al. | 123/143 B |
| 2012/0210969 | A1* | 8/2012 | Gruber et al. | 123/143 B |
| 2013/0104827 | A1* | 5/2013 | Woerner et al. | 123/143 B |
| 2013/0133602 | A1* | 5/2013 | Woerner et al. | 123/143 B |
| 2013/0139774 | A1* | 6/2013 | Woerner et al. | 123/143 B |
| 2013/0152893 | A1* | 6/2013 | Woerner et al. | 123/143 B |

FOREIGN PATENT DOCUMENTS

| | | |
|---|---|---|
| DE | 10 2006 018 973 | 10/2007 |
| EP | 1 820 948 | 8/2007 |
| JP | 2005-042582 | 2/2005 |
| WO | WO 2005/066488 | 7/2005 |
| WO | WO 2009/043608 | 4/2009 |
| WO | WO 2010/086287 | 8/2010 |
| WO | WO 2010/094552 | 8/2010 |
| WO | WO 2010/139577 | 12/2010 |

* cited by examiner

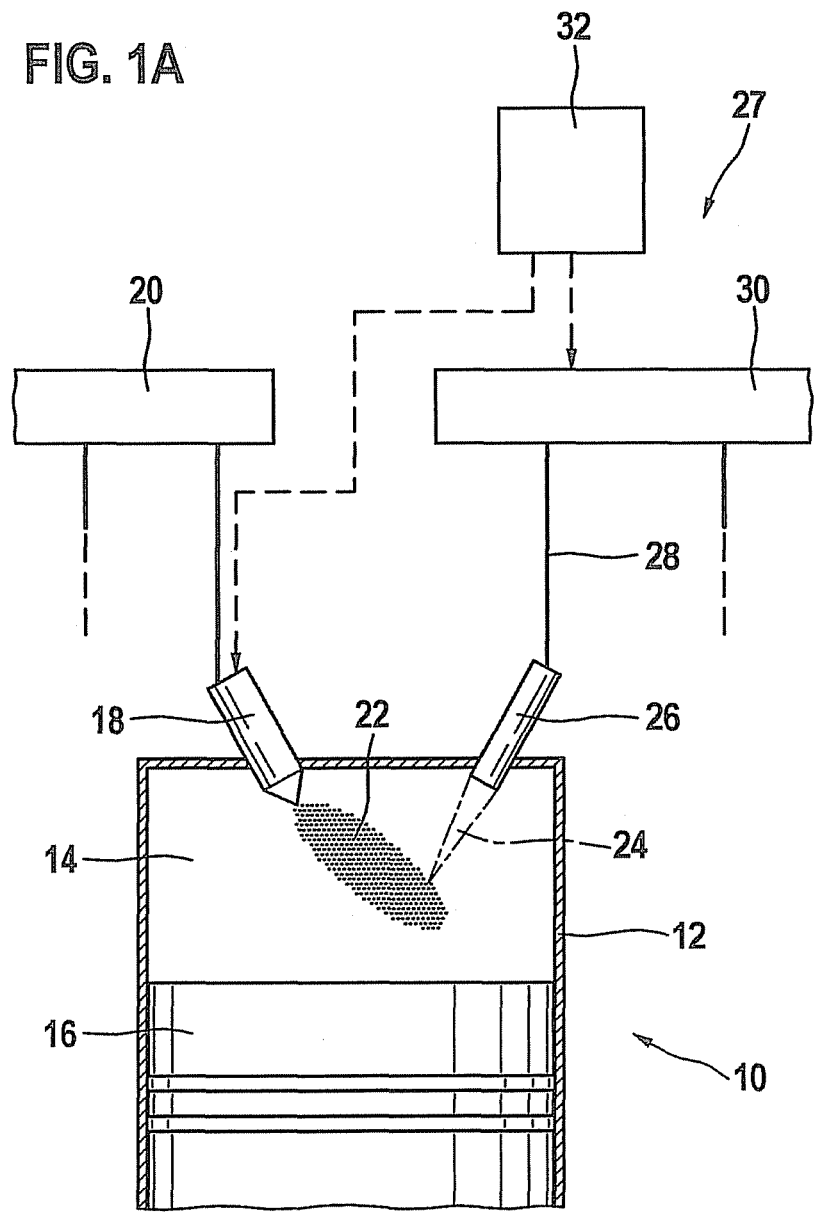

LASER IGNITION DEVICE

BACKGROUND OF THE INVENTION

1. Field of the Invention

The present invention relates to an ignition laser for a laser ignition device of an internal combustion engine.

2. Description of Related Art

A so-called laser igniter is known from published international patent application document WO 2005/066488 A1. This laser igniter includes an ignition laser, which protrudes into the combustion chamber of an internal combustion engine. This ignition laser is connected via an optical fiber to a pump light source.

A so-called combustion chamber window is provided on one end of the ignition laser facing toward the combustion chamber, which is transmissive for the laser pulses generated in the ignition laser. The laser wavelength is between 500 nm and 1500 nm, preferably between 900 nm and 1100 nm. This combustion chamber window must be sealingly accommodated in a housing of the ignition laser. High requirements are placed on the seal between the combustion chamber window and the housing, because surface temperatures of greater than 600° C. may occur on the combustion chamber window during the operation in an internal combustion engine, for example. In addition, intermittent pressure loads of greater than 250 bar occur. If an ignition laser is used to ignite a gas turbine, lower pressures do prevail in the combustion chamber of the gas turbine; however, the surface of the combustion chamber window may reach temperatures of up to 1000° C.

In order for the laser igniter to operate without interference, the combustion chamber window must be transparent to the laser beams over the entire lifetime of the internal combustion engine. However, deposits may accumulate on the combustion chamber window during the operation, so that the required optical transparency of the combustion chamber window is lost. In order to prevent these deposits, the ignition laser is to be designed in such a way that the operating temperature on the surface of the combustion chamber window facing toward the combustion chamber is sufficiently high to burn off or oxidize deposits, above all of an organic nature.

However, the surface temperature of the combustion chamber window may not be so high that self-ignition of the fuel-air mixture may occur on the surface of the combustion chamber window or deposits, in particular oil ashes, may be formed on the combustion chamber window.

An ignition laser is known from published German patent application document DE 198 10 750 A1, in which the temperature of the combustion chamber window may be reduced by increasing the heat dissipation into the base of the ignition laser.

As a result, the surface temperature of the combustion chamber window in the entire operating range of the internal combustion engine must be kept above the burnoff temperature for organic coatings, which is approximately 400° C., and below a temperature of 600° C., from which a growth of crystalline phosphates from the oil ashes is known. This means that a temperature range between 420° C. and 550° C. is to be permanently achieved on the surface of the combustion chamber window.

Since this mentioned temperature range may not be maintained at least during the cold start of the internal combustion engine, rapid heating of the ignition laser or the combustion chamber window is desirable. Simultaneously, during steady operation of the internal combustion engine, the heat from the ignition laser must be sufficiently dissipated to avoid excess temperatures.

BRIEF SUMMARY OF THE INVENTION

The present invention is based on the object of providing an ignition laser which allows in particular rapid heating of the ignition laser or the associated combustion chamber window to the required temperature of 400° C., so that the burnoff temperature for organic coatings is achieved as rapidly as possible after the cold start of the internal combustion engine, and these coatings therefore may not accumulate permanently on the combustion chamber window.

This object is achieved according to the present invention for an ignition laser according to the definition of the species in that means are provided for influencing the heat conduction, which allow an adjustment of the heat transport from the combustion chamber via the housing of the ignition laser to the combustion chamber window, so that rapid heating of the combustion chamber window is achieved for all applications.

The means for influencing the heat conduction on one end of the housing facing toward the combustion chamber may include a heat conduction element, in particular a heat conduction ring made of a material having good thermal conductivity, in particular nickel and/or nickel-plated copper. This heat conduction element may either be integrally designed with the housing of the ignition laser or it may be made of a different material than the housing of the ignition laser and may be connected thereto in a proper heat conducting way, for example, by soldering or welding. Nickel or copper have proven themselves as suitable materials for such a heat conduction element, since they have very good thermal conductivity. The heat conduction element according to the present invention functions similarly to a cooling rib, since the heat absorption from the hot exhaust gases and the introduction of this heat into the housing of the ignition laser are accelerated and improved by the enlarged surface area of the heat conduction element.

The means for influencing the heat conduction, in the case of an ignition laser on whose housing an external thread is formed, may be that the external thread ends at a distance from one end of the ignition laser facing toward the combustion chamber. Specifically, if the external thread, which is typically used for screwing the ignition laser into the cylinder head of an internal combustion engine, is not led up to the end of the ignition laser, the heat dissipation from the end of the ignition laser facing toward the combustion chamber is reduced and the heating of the ignition laser is therefore accelerated.

In a further advantageous embodiment of the present invention, it is provided that at least one intermediate element, in particular a ring-shaped intermediate element, made of a material having poor thermal conductivity, preferably made of mica, is provided between the housing and the combustion chamber window. This intermediate element is used for the purpose of reducing the heat dissipation from the combustion chamber window and thus accelerating the heating of the combustion chamber window or increasing the stationary surface temperature of the combustion chamber window.

The intermediate elements may be designed as discs in the form of circular rings and may be provided in the axial direction in front of or behind one or both sides of the combustion chamber window between the housing and the combustion chamber window. For example, if only one intermediate element is provided and this intermediate element is situated on the contact surface facing away from the combustion chamber between the combustion chamber window and the housing, the dissipation of heat from the combustion chamber window into the base of the housing is thus reduced and as a result the heating is accelerated.

Furthermore, however, it is also possible to provide such an intermediate element on the contact surface facing toward the combustion chamber between the combustion chamber window and the housing. The heat introduction from the front side of the housing into the combustion chamber window is thus reduced, so that in this way the heating speed or the stationary surface temperature of the combustion chamber window may be influenced and adapted in accordance with the requirements of the specific case.

The object mentioned at the outset is also achieved in that the combustion chamber window is made of two different materials. Of course, the combustion chamber window must be transparent or transmissive for light having a wavelength of the ignition laser, so that the laser pulse from the interior of the ignition laser may reach the combustion chamber. A particularly suitable material for focusing the laser pulse is crystalline sapphire, which has a relatively high thermal conductivity of approximately 40 W/mK at room temperature, however.

It is provided according to the present invention to use crystalline sapphire in the area of the combustion chamber window directly adjoining the optical axis of the ignition laser as the material for the combustion chamber window and to manufacture the radial outside areas of the combustion chamber window from a different material, which has a lower thermal conductivity. The combustion chamber window is thus formed according to the present invention from a central area having optimum optical properties and a radial outer ring-shaped area which is optimized with respect to the thermal conductivity. Suitable materials for the second, outer area of the combustion chamber window are, for example, quartz glass, which has a thermal conductivity of only approximately 4 W/mK at room temperature, YAG, having a thermal conductivity of approximately 14 W/mK at room temperature, or zirconium oxide, having a thermal conductivity of approximately 10.5 W/mK at room temperature. It is already clear from the comparison of the thermal conductivities of the listed materials that the heat dissipation from the combustion chamber window may be controlled in very wide limits through a combustion chamber window which is made of two different materials, so that the surface temperature of the combustion chamber window may be set to the desired values and simultaneously very rapid heating of the combustion chamber window to temperatures above 400° C. may be achieved through suitable dimensioning and combining of the mentioned materials.

It is obvious that the features of the other independent claims may be used individually in an ignition laser according to the present invention. However, it is also readily possible to combine several of these features with one another. Thus, for example, it is readily possible, as shown in FIG. 2, to provide a heat conduction ring and simultaneously not to lead the external thread of housing 38 of the ignition laser up to the front side of the ignition laser.

This also applies accordingly to the intermediate elements between combustion chamber window 58 and the housing or the one combustion chamber window, which is made of two different materials.

BRIEF DESCRIPTION OF THE DRAWINGS

FIG. 1a shows a schematic view of a laser-based ignition device in an internal combustion engine.

DETAILED DESCRIPTION OF THE INVENTION

Figure 1B:
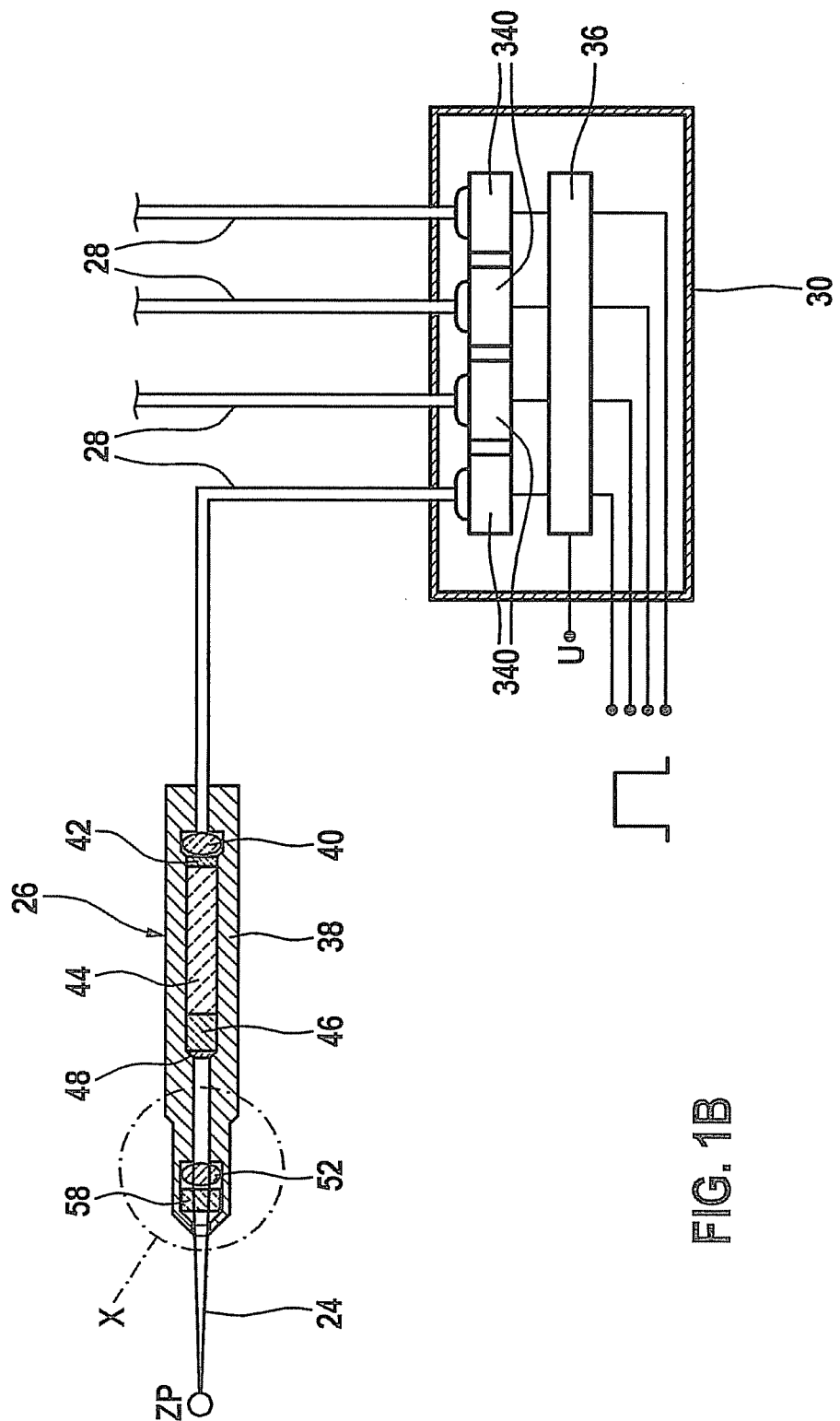
FIG. 1b shows a schematic and detailed view of the ignition device from FIG. 1.

The ignition device according to the present invention is explained on the basis of the figures for exemplary purposes in an internal combustion engine. However, the ignition laser may also be implemented in a gas turbine.

An internal combustion engine bears reference numeral 10 as a whole in FIG. 1a. It may be used to drive a motor vehicle (not shown) or it may be used as a gas engine for power generation. Internal combustion engine 10 typically includes multiple cylinders, only one of which is identified by reference numeral 12 in FIG. 1a. A combustion chamber 14 of cylinder 12 is delimited by a piston 16. Fuel reaches combustion chamber 14 through an injector 18, which is connected to a fuel pressure storage 20, also referred to as a rail. Alternatively, the fuel-air mixture may also be produced outside combustion chamber 14, for example, in the intake manifold.

Fuel-air mixture 22 present in combustion chamber 14 is ignited using a laser pulse 24, which is emitted into combustion chamber 14 by an ignition device 27 including an ignition laser 26. For this purpose, ignition laser 26 is supplied with a pump light, which is provided by a pump light source 30, via an optical fiber device 28. Pump light source 30 is controlled by a control unit 32, which also activates injector 18.

As is apparent from FIG. 1b, pump light source 30 supplies multiple optical fiber devices 28 for various ignition lasers 26, which are each assigned to one cylinder 12 of internal combustion engine 10. For this purpose, pump light source 30 has multiple individual laser light sources 34, which are connected to a pulse current supply 36. A "steady" distribution of pump light to various laser devices 26 is also implemented by the presence of multiple individual laser light sources 34, so that no optical distributors or the like are required between pump light source 30 and ignition lasers 26.

Ignition laser 26 has a laser-active solid body 44 having a passive Q-switch 46, which forms an optical resonator together with a coupling mirror 42 and a decoupling mirror 48. Upon application of the pump light generated by pump light source 30, ignition laser 26 generates a laser pulse 24 in a way known per se, which is focused by a focusing lens 52 on an ignition point ZP located in combustion chamber 14 (FIG. 1a). The components present in housing 38 of ignition laser 26 are separated from combustion chamber 14 by a disk-shaped combustion chamber window 58. Combustion chamber window 58 may be designed to be square or preferably round.

Figure 2:
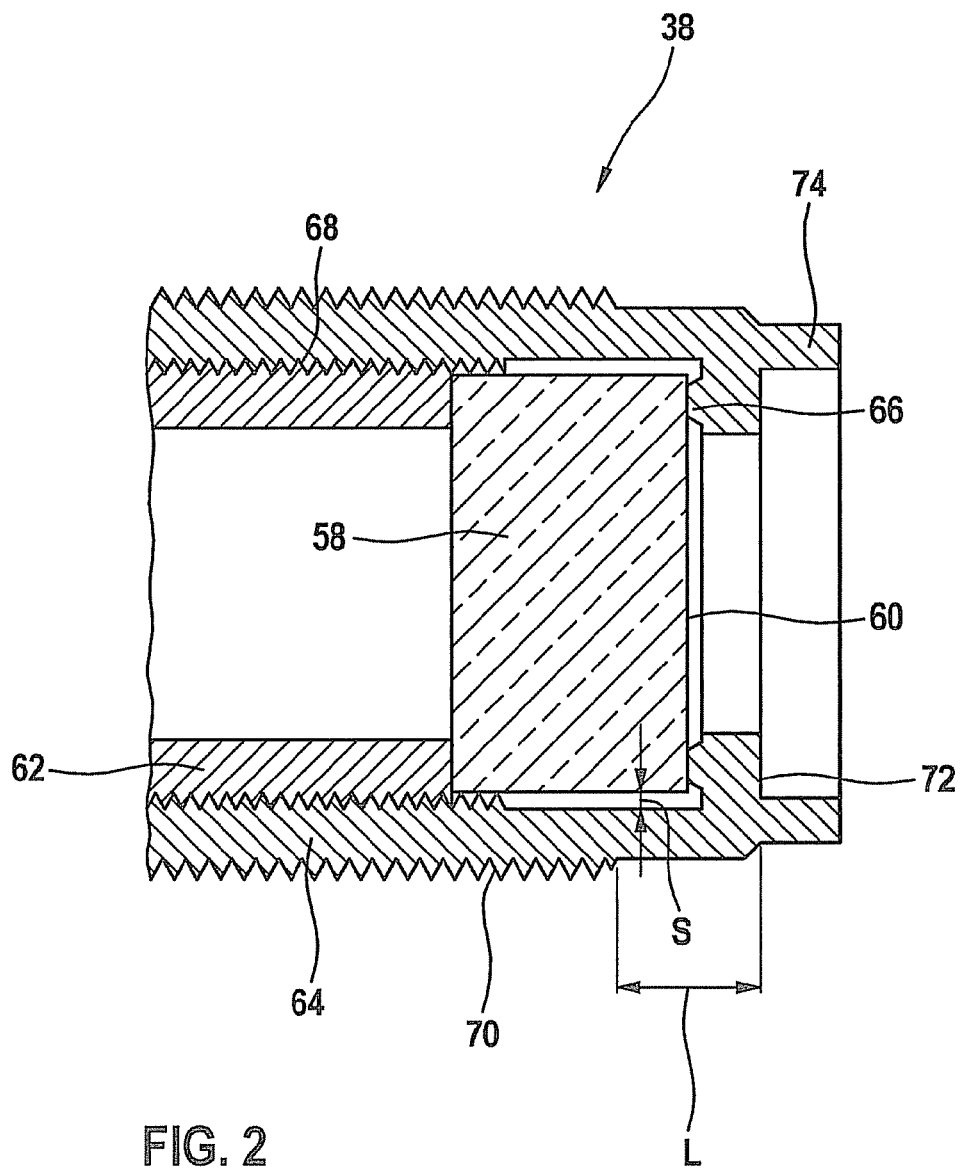
FIGS. 2 through 4 show exemplary embodiments of ignition lasers according to the present invention.
Figure 3:
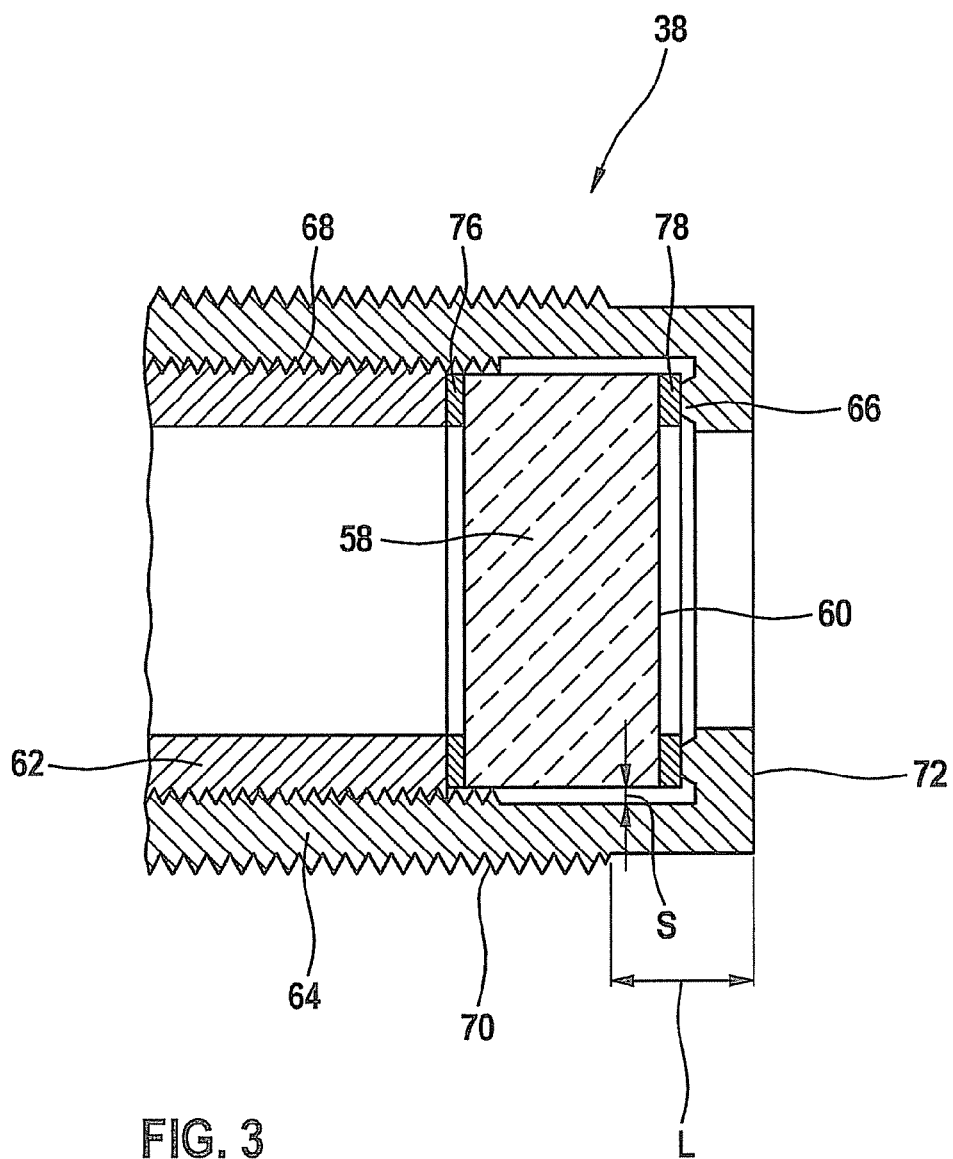
Figure 4:
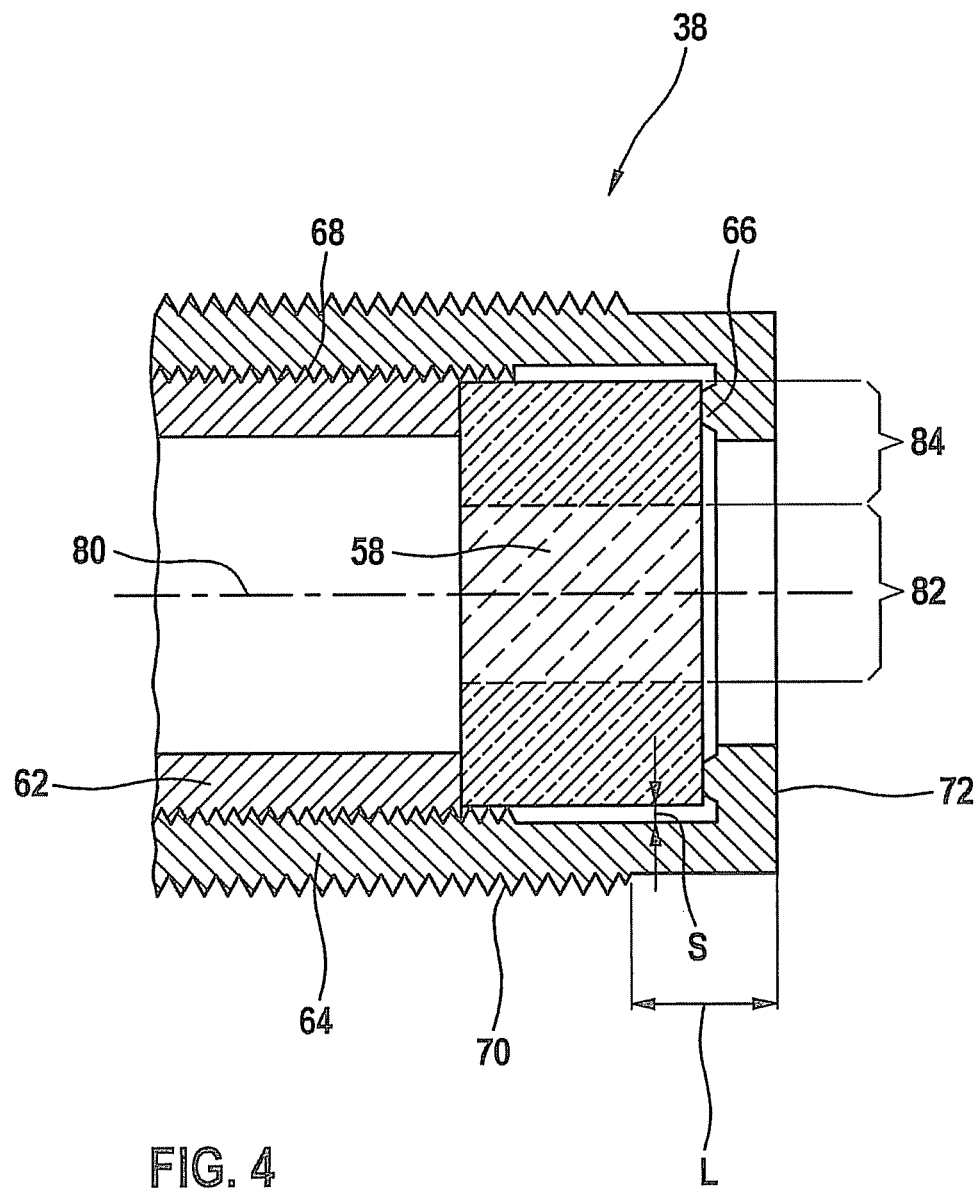

Different specific embodiments according to the present invention of laser devices 26 are shown enlarged in FIGS. 2 through 4. The end of ignition laser 26 facing toward combustion chamber 15 is primarily shown.

The surface of combustion chamber window 58 facing toward combustion chamber 14 (see FIG. 1a) is provided with reference numeral 60 in FIG. 2.

In the exemplary embodiment shown in FIG. 2, housing 38 has a two-part design. In the exemplary embodiment shown, an inner part 62 is screwed together with an outer part 64 of housing 38. Other connections are also possible, in particular integral bonds by soldering or welding. Combustion chamber window 58 is clamped sealingly between a front side (without reference numeral) of the inner part and a shoulder 66 of outer part 64. Possibly required additional sealing elements are not shown in FIG. 2. Since outer part 64 and inner part 62 may be connected to one another by a thread 68, the contact force, using which combustion chamber window 58 is clamped between inner part 62 and shoulder 66 of outer part 64, may be set by a corresponding clamping torque. In the case of welded or soldered bonds, this contact force is to be implemented by suitable process control, for example, by mechanical pressing during the joining procedure.

Outer part 64 or housing 38 has an external thread 70, which is used to screw ignition laser 26 into a cylinder head (not shown) of an internal combustion engine, for example.

It is provided according to the present invention that external thread 70 is not led up to a front side 72 of housing 38, but rather is ended at a distance L before front side 72. This means that the diameter of housing 38 in the area between the end of external thread 70 and front side 72 of the housing is smaller than the core hole diameter of external thread 70. As a result, the cross section of housing 38, in particular of outer part 64, is reduced in this area and therefore the heat flow is reduced from front side 72 into the areas of housing 38 facing away from the combustion chamber. This has the result that during a cold start of the internal combustion engine, combustion chamber window 58 and in particular surface 60 of combustion chamber window 58 facing toward the combustion chamber heat up more rapidly and the burnoff temperature of 400° C. is therefore reached more rapidly.

A further design feature according to the present invention for controlling or increasing the surface temperature of combustion chamber window 58 is shown in the exemplary embodiment according to FIG. 2. Specifically, a heat conduction ring 74 is formed on front side 72, which may either be designed integrally with outer part 64 of housing 38 or may be manufactured as a separate component made of a material having good thermal conductivity, for example, nickel or copper. In this case, connecting heat conduction ring 74 to housing 38 by integral bonding, for example, by soldering or welding, and therefore in a way having good thermal conductivity, is recommended.

Heat conduction ring 74 more or less has the task of a cooling rib, so that according to the present invention it is to introduce heat from the combustion chamber into housing 38 and therefore also into combustion chamber window 58. It is obvious that further parameters for influencing the surface temperature or the operating temperature of the combustion chamber window are provided by the geometry and the dimensions of the heat conduction ring. Fundamentally, a large heat-transferring surface between heat conduction ring 74 and the surrounding combustion air and the exhaust gases in the combustion chamber results in an increased heat transfer. A large mass or a large volume of the heat conduction ring results in increased thermal inertia. These parameters may be used in order to allow rapid heating, on the one hand, and to achieve a certain thermal inertia, on the other hand, so that the maximal permissible surface temperature of combustion chamber window 58 is not reached or exceeded under all operating states.

It is obvious that the two features according to the present invention, namely heat conduction ring 74 and external thread 70 which is not formed up to front side 72, may also be designed individually on an ignition laser 26. It is not necessary to implement these two features together on one ignition laser 26.

A further exemplary embodiment of an ignition laser 26 according to the present invention is shown in FIG. 3.

In this exemplary embodiment, intermediate rings 76 and 78 are inserted between housing 38 and combustion chamber window 58. These intermediate rings 76 and 78 are made of a material having poor thermal conductivity, for example, mica. However, all other materials which have a poor thermal conductivity and sufficient temperature resistance are also suitable. First intermediate ring 76 and second intermediate ring 78 may also be used individually, depending on the extent to which the heat conduction or the heat dissipation is to be controlled within ignition laser 26.

For example, if only first intermediate ring 76 is inserted between inner part 62 and combustion chamber window 58, the heat conduction from combustion chamber window 58 into inner part 62 is reduced, so that the temperature of laser-active solid body 44 is reduced. The operating temperature of combustion chamber window 58 increases simultaneously.

The heat dissipation from the combustion chamber window into inner part 62 may be controlled within wide limits by the thickness of first intermediate ring 76. If second intermediate ring 78 is inserted between combustion chamber window 58 and shoulder 66 of outer part 64, the heat transfer from housing 38 into combustion chamber window 58 is reduced.

Therefore, the operating temperature of combustion chamber window 58 and the speed at which combustion chamber window 58 heats up during a cold start may be controlled within wide limits by the attachment of first intermediate ring 76 and/or second intermediate ring 78.

A further exemplary embodiment of an ignition laser 26 according to the present invention is shown in FIG. 4. Combustion chamber window 58 is constructed from two different materials. Combustion chamber window 58 is manufactured from a first material having optimized optical properties concentrically or coaxially to an optical axis 80 of ignition laser 26. This first area is provided with reference numeral 82 in FIG. 4. For example, combustion chamber window 58 may be manufactured from a crystalline sapphire ($Al_2O_3$) in this first area 82. Crystalline sapphire has a relatively high thermal conductivity of approximately 40 W/mK at room temperature.

In a radial outer second area 84, combustion chamber window 58 is manufactured from another transparent material, for example, quartz, YAG, or zirconium oxide. The mentioned materials are mentioned as examples and are not to be understood as a conclusive enumeration. All of these materials share the feature that they have a significantly lower thermal conductivity than crystalline sapphire. Therefore, it is possible through the construction according to the present invention of combustion chamber window 58 from two different materials to control the heat dissipation from or the heat introduction into combustion chamber window 58 within wide limits.

In order to manufacture such a combustion chamber window, for example, it is possible to fuse a quartz ring having lower thermal conductivity onto a sapphire window. Of course, it is also possible to combine other materials with one another. In the context of the present invention, the general term "quartz" certainly includes quartz glass, fused silica, and $SiO_2$ in amorphous form.

All specific embodiments which have been shown and explained for exemplary purposes on the basis of FIGS. 2 through 4 share the feature that they may be implemented individually or in any arbitrary combination in an ignition laser 26. A mass-produced ignition laser 26 may therefore be adapted to the usage conditions within wide ranges with respect to the operating temperature and the heating speed of combustion chamber window 58 by combination of individual or multiple features according to the present invention.

What is claimed is:

1. An ignition laser for a laser ignition device of an internal combustion engine, comprising:
   a laser-active solid body;
   a combustion chamber window;

a housing, wherein an internal thread and an external thread are formed on the housing; and a unit configured to influence heat conduction, wherein the unit is formed on one end of the housing facing toward a combustion chamber.

2. The ignition laser as recited in claim 1, wherein the unit configured to influence the heat conduction includes a heat conduction element made of a high thermal-conductivity material including at least one of nickel and nickel-plated copper.

3. The ignition laser as recited in claim 2, wherein the unit configured to influence heat conduction includes at least one intermediate element between the housing and the combustion chamber window, and wherein the intermediate element is made of a low thermal-conductivity material including mica.

4. The ignition laser as recited in claim 2, wherein the combustion chamber window is made of two different materials.

5. The ignition laser as recited in claim 4, wherein the combustion chamber window is made of: (i) a transparent first material having optimized optical properties, located in a first area situated directly around an optical axis of the ignition laser; and (ii) a second material having lesser thermal conductivity than the transparent first material, the second material being located in a radial outer second area.

6. The ignition laser as recited in claim 5, wherein at least one of: (i) the transparent first material is crystalline sapphire ($Al_2O_3$); and (ii) the second material is one of quartz glass, YAG, or zirconium oxide.

7. The ignition laser as recited in claim 2, wherein the housing has a two-part configuration including an outer housing wall and an inner housing wall.

8. The ignition laser as recited in claim 2, wherein the laser-active solid body includes at least one of a passive Q-switch, a coupling mirror, and a decoupling mirror.

9. The ignition laser as recited in claim 1, wherein an external thread is formed on the housing, and wherein the external thread ends at a predetermined distance from one end of the ignition laser facing toward the combustion chamber.

10. A laser ignition device, comprising:

a control unit;

a pump light source for generating pump light, wherein the pump light source is operatively coupled to the control unit;

an optical fiber device operatively coupled to the pump light source to receive the pump light; and an ignition laser having:

a laser-active solid body;

a combustion chamber window;

a housing, wherein an internal thread and an external thread are formed on the housing; and a unit configured to influence heat conduction, wherein the unit is formed on one end of the housing facing toward a combustion chamber.

* * * * *